(12) United States Patent
Chatard et al.

(10) Patent No.: US 7,244,381 B2
(45) Date of Patent: Jul. 17, 2007

(54) METHOD FOR BLOW FORMING A CONTAINER MADE OF PLASTIC AND FOR COATING THE INSIDE OF SAID CONTAINER

(75) Inventors: Dominique Chatard, Heidelberg (DE); Heinrich Grunwald, Niddatal (DE); Wilhelm Lothar, Karben (DE); Hanno Käss, Darmstadt (DE)

(73) Assignee: Tetra Laval Holdings & Finance S.A., Pully (CH)

( * ) Notice: Subject to any disclaimer, the term of this patent is extended or adjusted under 35 U.S.C. 154(b) by 689 days.

(21) Appl. No.: 10/472,370

(22) PCT Filed: Feb. 28, 2002

(86) PCT No.: PCT/EP02/02160

§ 371 (c)(1),
(2), (4) Date: Sep. 22, 2003

(87) PCT Pub. No.: WO02/076709

PCT Pub. Date: Oct. 3, 2002

(65) Prior Publication Data

US 2004/0089967 A1    May 13, 2004

(30) Foreign Application Priority Data

Mar. 23, 2001 (DE) ................................. 101 14 401

(51) Int. Cl.
*B29C 49/16* (2006.01)
*B29C 49/46* (2006.01)

(52) U.S. Cl. ........................................................ 264/84
(58) Field of Classification Search ................... 264/84
See application file for complete search history.

(56) References Cited

U.S. PATENT DOCUMENTS 3,236,080 A    2/1966    E.W. Iligen (Continued)

FOREIGN PATENT DOCUMENTS

DE    19502103    8/1995

(Continued)

OTHER PUBLICATIONS

"Aseptic Plastic Filling / Auf zu neuen Ufern", pp. 24-25, Jan. 2000.

*Primary Examiner*—Suzanne E. McDowell
(74) *Attorney, Agent, or Firm*—Michael L. Dunn

(57) ABSTRACT

The invention relates to a method for blow forming a container (1) from a parison (2) made of plastic. After heating, said container is preformed by a gas injected into the container (1, 2) at a low pressure of 5 bar and by expanding the inner volume of said container. The final shape of the container can then be achieved by igniting an inflammable gas injected into the container, whereby the combustion generates a higher blowing pressure, or by injecting an additional gas with a higher blowing pressure of approximately 40 bar into the container after pre-blowing. The invention aims at improving known blow forming methods in such a way that a barrier layer impervious to gases, aromatic substances or the like is produced on the inner side of the container without having to use big machines. To this end, a precursor gas is added to and mixed with the inflammable gas, the mixture is then ignited and a coating is formed on the inner surface of the container by the combustion. Alternatively, an inflammable precursor gas is injected into the shaped, stress-relieved container that has been formed by means of classical stretch blow forming. Said gas is then ignited and once again the coating is formed on the inner surface of the precursor gas by the combustion.

25 Claims, 5 Drawing Sheets

Figure 1:
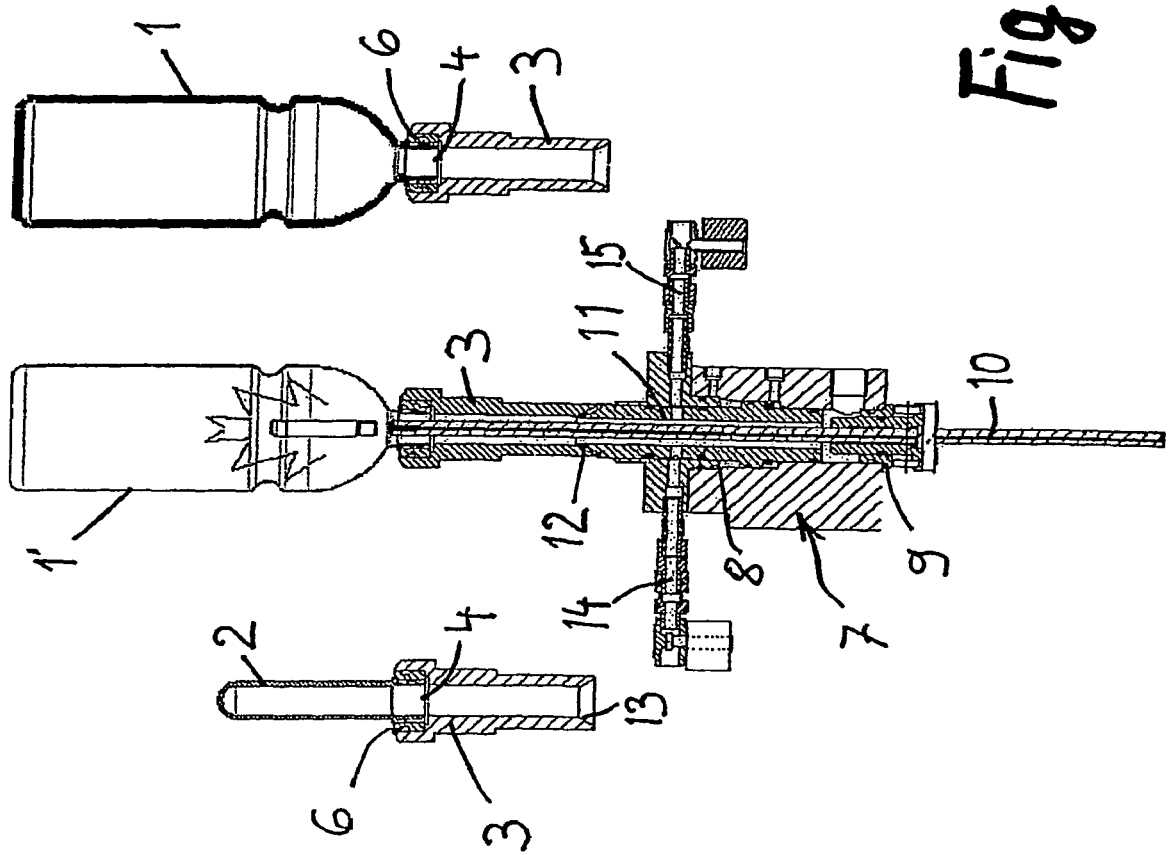

U.S. PATENT DOCUMENTS 3,252,312 A * 5/1966 Maier ........................... 72/56
5,049,330 A * 9/1991 Rebhan ........................ 264/84
5,531,060 A * 7/1996 Fayet et al. .................... 53/426
5,622,735 A    4/1997 Krishnakumar et al.
6,315,939 B1 * 11/2001 Mock et al. ................ 264/454

FOREIGN PATENT DOCUMENTS

| | | |
|---|---|---|
| DE | 4438359 | 5/1996 |
| DE | 69124959 T | 6/1997 |
| DE | 19802506 | 7/1999 |
| DE | 19938724 | 2/2001 |
| DE | 19957744 | 6/2001 |
| DE | 19960333 | 6/2001 |
| JP | 56027330 | 3/1981 |
| JP | 61032978 B | 7/1986 |
| JP | 62130823 | 6/1987 |
| JP | 2000167915 A | 6/2000 |
| WO | PCT/CH97/00296 | 8/1997 |

* cited by examiner

METHOD FOR BLOW FORMING A CONTAINER MADE OF PLASTIC AND FOR COATING THE INSIDE OF SAID CONTAINER

The invention relates to a process for blow moulding a vessel from a plastic preform which, after heating, is preformed by a gas which is blown into the vessel at low pressure of between 2 bar and 15 bar with an accompanying increase in its internal volume and is shaped into its definitive form by ignition of a blown-in, combustible gas by the higher gas pressure arising during combustion.

When blow moulding the definitive vessel the starting point is a preform which normally consists of the material polyethylene terephthalate and is injection-moulded. The pre-forming at low pressure leads to an intermediate moulded article (before the first combustion). After the combustion (for example already after the first combustion) the finished vessel (final moulded article) is obtained in its definitive form. By "moulded article" is meant each of the three physical states.

It is known to produce plastic vessels from polyethylene by extrusion of the melted plastic in the form of a tube, the final shaping taking place by blowing a gas into a mould cavity (extrusion blow moulding). More rigid plastics, such as for example PET (polyethylene terephthalate), are blown from a preheated preform accompanied by mechanical stretching into a mould cavity (stretch blow moulding). The inside of the mould cavity corresponds to the finished vessel, which has similarly to a bottle for example an open end which is held by a housing with gas supply lines.

From the international publication WO 98/06 559 a further development of the process for stretch blow moulding of PET bottles is known which can be described as "explosion-stretch blow moulding". The pre-shaped preform is then heated to a temperature of roughly 100 to 120° C. which is suitable for stretch blow moulding and introduced into the mould. The process mentioned at the start produces the low pressure of the gas blown into the PET bottle, with an explosive gas mixture, for example a mixture of oxyhydrogen gas and an inert gas. By igniting this gas mixture the mentioned higher blowing pressure arises, which presses the wall of the intermediate moulded article or of the partly pre-shaped vessel completely against the inner wall of the mould. The explosive gas mixture, i.e. the blown-in, combustible gas, is a mixture of an oxidation agent for example oxygen and an oxidizable component, such as for example hydrogen, methane or similar.

Such known PET bottles are often used for the packaging for example of water. It is known that the walls of such PET bottles are permeable for low-molecular gases. In the case of packaged liquid foods, in particular juices and $CO_2$-containing beverages, the keeping times are limited as a consequence. In order to prevent the oxygen responsible for this from penetrating or the carbon dioxide from escaping and in order to thus make such plastic packaging better usable for liquid foods, there has already been a move to the internal and external coating of walls of these plastic packs. An example of such a known coating process for improving this so-called blocking or barrier property of plastic packs is plasma-supported chemical deposition from the gas phase. In the case of internal coating a gas mixture is introduced into the pack representing the vessel. Electromagnetic energy is irradiated, ignites the plasma, and, during this treatment process for example a glass-like silicon oxide or an amorphous carbon layer is deposited in the inside of the vessel. Low-molecular gas, for example oxygen or carbon dioxide, may penetrate the plastic walls much more slowly through this additional barrier and organic compounds may also no longer enter the plastic, with the result that, in the case of packaged liquid foods, the beverages can thereby keep their taste, aroma and their quality much longer.

Attempts have already been made on the other hand to produce a vessel by blow moulding wherein the gas used for blow moulding is already a process gas with the help of which the blow-moulded vessel is provided internally by vacuum vaporisation with a barrier layer which consists of a silicon compound. To produce the coating the conventional chemical plasma vapour deposition was carried out here, the plasma being ignited by an electric microwave field.

This requires extensive machinery and in addition during blow moulding a high pressure of roughly 40 bar was initially produced in the vessel, which then had to be expanded to vacuum with corresponding time outlay in order to carry out the plasma-supported coating. Apart from the lengthiness of this process when switching from high pressure to vacuum and the use of large machinery it also transpired that the yield of gases used is so low that an industrial applicability cannot be considered.

The need therefore exists to apply coatings with high barrier effect to the inside of plastic vessels if at all possible directly after or even during the production process of the vessel. The internal coating is particularly favourable because aromas or similar can otherwise enter the vessel wall. During the production of plastic vessels, in particular PET, HDPE, polyacrylonitrile or polycarbonate, the blow moulding process is to be combined with the coating process.

The object of the invention is therefore the creation of a blow moulding process of the type mentioned at the start, with which a vessel, for example a PET bottle, is provided, during the course of the moulding process or directly afterwards, on its inside with a barrier layer which is impermeable for gases, aromas and similar without having to use large machines, vacuum units and similar.

This object is achieved according to the invention in that a precursor gas is added to the combustible gas, this mixture is ignited and through the combustion a coating is formed on the inner surface of the vessel.

With the process according to the invention vessels are produced by blow moulding which are made from plastic, as stated above. These vessels can also include packaging, all types of vessels being considered which can be produced by blow moulding, in particular bottles open on one side. In the case of the known blow moulding processes the final shaping takes place at the latest in a mould cavity, vessels can however also be blow moulded without such a cavity. For the blow moulding, preforms are used which generally have a smaller internal volume than the internal volume ultimately formed by final shaping of the vessel. Such preforms can also be produced by injection-moulding. The preforms can have the form of an elongated tube or a bottle. There are however also preforms made of an extruded tube piece which can be compressed and heat-sealed at the desired ends. Depending on the production process such a preform is either still hot or heated to roughly 100° C. or 120° C. in order to become blowable.

The blow moulding according to the invention takes place initially in a first step in which a gas is blown into the preform at low pressure in the range between 2 and 15 bar to form an intermediate moulded article. The internal volume of the preform is thereby increased and the vessel is pre-formed in this way.

The final shaping of the vessel into its definitive form then takes place in a second step by blowing in a combustible gas which is then ignited and through the combustion, in particular through an explosive combustion, allows a higher blowing pressure to arise. After application of this blowing pressure the vessel is shaped into its definitive form.

A vessel produced according to this process is however still not coated on its inner surface. According to the invention, measures are given by the above features that the desired coating is produced as a barrier layer in combination with the blow moulding steps, so that, in a preferred version, the blow moulding machine can even be identical to the coating machine.

Separate coating machines are no longer necessary through the measures according to the invention. According to the invention a precursor gas or forerunner gas on the previously stated basis, for example based on silicon or hydrocarbon, is added to the combustible gas and passed to the combustion stage by ignition, so that through the combustion, the coating on the named basis, for example silicon oxide basis or on organic carbon basis, is formed on the inner surface of the vessel.

According to the invention, the potential chemical energy, in particular the energy produced by the rapid combustion, is used in order to produce the sought coating at high speed inside the vessel. This combustion step not only allows a cheap coating without great outlay on machinery, but also creates, if desired, an aseptic packaging, the vessel being aseptic directly after its production.

In a first version it is particularly advantageous according to the invention if the precursor gas is formed on the basis of silicon, magnesium, aluminium, titanium, zinc, zirconium, boron, cerium, calcium or tin oxide or the like or on the basis of mixtures thereof and if a coating on a silicon oxide, silicon oxynitride, magnesium oxide, aluminium oxide, titanium oxide, titanium nitride, zinc oxide, zirconium oxide, boron oxide, cerium oxide, calcium oxide or tin oxide basis or the like or on the basis of mixtures thereof results. The combustible gas mixture should preferably act in oxygen excess in this version. The barrier effect of the barrier layers can thereby be optimized. The layers are thereby completely oxidized, i.e. a maximum of oxygen and/or nitrogen atoms is incorporated to this end. "In excess" means that the combustible gas has a higher oxygen proportion than would be necessary for its own combustion (oxidizing operating mode). Advantageously the oxygen proportion is chosen such that it is sufficient to also completely oxidize the precursor compound.

A forerunner gas on the basis of silicon, magnesium, aluminium, titanium, zinc, zirconium or boron or the like or on the basis of mixtures thereof is named as precursor or forerunner material for the first version considered here, the combustion of this mixture of the combustible gas and the precursor gas giving a coating of the named type, which consists of an essentially inorganic compound which forms stable and dense structures in the coating.

The barrier layer is a predominantly or completely inorganic compound which typically consists of a metal or semimetal as well as a non-metallic proportion, such as oxygen and/or nitrogen. In addition, proportions of carbon and hydrogen can also be contained. Thus this typically involves oxides, nitrides or oxynitrides of metals such as: aluminium, magnesium, titanium, zirconium, zinc and/or semimetals, such as silicon or boron.

Such an inorganic compound forming the barrier layer can be made even thicker by incorporating a smaller proportion of atoms of a further metal or semimetal.

In a preferred version, namely by selection and suitable reaction of the precursor material, carbon can be added to the chemical composition of the coating. This or similar measures have the effect that the coating structure is not completely stiff or rigid. Through the reaction in this version (for example the addition of carbon), the coating is also less inclined to break when exposed to mechanical effects, for example stretching or bending.

Similarly stable and dense structures in the coating are obtained for a second version if according to the invention the precursor gas consists of at least a volatile hydrocarbon compound based on alkanes or alkenes, alkines, aromatics, alkanols, ethers, aldehydes, ketones, epoxides, organic acids, esters or corresponding other hydrides. A barrier layer results which is more stable vis-à-vis products with pH values in the basic range (thus above 7) and which is compatible in particular with vessel walls made of polyolefins, such as for example polyethylene, polypropylene. An example of alkanes is ethane, of alkenes say ethene or propylene, of alkines acetylene. Aromatic compounds can also be used, such as for example toluene. Oxygen-containing hydrocarbons can also be used, such as alkanols. Examples of these are: methanol, ethanol, propanol, ethylene glycol. An example of ethers is dioxan, of aldehydes acetaldehyde, of ketones benzaldehyde, of epoxides propylene oxide, of organic acids acetic acid, of esters for example ethyl acetate and of anhydrides for example maleic anhydride.

Instead of the essentially inorganic metal oxide layer in the one version an organic carbon layer can thus also be applied as barrier layer to the inner wall of the vessel in the other version. For the application of the organic carbon layer hydrocarbon compounds are also introduced into the pre-blown or moulded vessel in addition to the $H_2/O_2$ mixture, the combustion of which leads to the moulding of the bottle. It is necessary in this case to avoid an excess of oxygen in the gas mixture, as otherwise a complete oxidation of the hydrocarbon compound would occur and no layer would be deposited. The oxygen dosage has to be set such that during the explosion sufficient energy is released for the process and simultaneously the hydrogen of the hydrocarbon compound is sufficiently extensively consumed to make possible the deposition of a sufficiently dense carbon barrier layer.

In a further favourable version according to the invention the precursor gas consists of a mixture of at least one volatile metal compound and at least one volatile hydrocarbon compound. "Volatile" means according to the invention that the metal compound used evaporates at temperatures in the range of room temperature. This is the case for example with tetramethylsilane.

A further preferred version of the invention is characterized in that the admixing of the precursor gas takes place before pre-forming and the coating is formed during the final forming. This means that, after heating, the preform is already pre-formed with the considered gas mixture. This gas mixture is the combustible gas, mixed with the forerunner gas.

This is for example oxyhydrogen gas, mixed with tetramethylsilane as forerunner gas. This combustible, volatile liquid, also abbreviated to TMS, is also known as gas. This gas mixture of for example oxyhydrogen gas plus TMS is used for pre-forming at low pressure and in the next step as in explosion-stretch blow moulding according to WO 98/06 559 is ignited so that the vessel thus obtains its definitive form. Simultaneously the inner walls of the vessel are thus provided with the desired coating which in the case of the forerunner material TMS is based on silicon oxide. This coating has outstanding barrier properties.

If oxyhydrogen gas, mixed with acetylene, is alternatively taken as combustible gas, mixed with the forerunner gas, then this combustible, volatile gas mixture of for example oxyhydrogen gas plus acetylene is used for pre-forming at low pressure and in the next step, as in explosion-stretch blow moulding, is ignited so that the vessel obtains its definitive form. Simultaneously the inner walls of the vessel are provided with the desired coating which in the case of the forerunner material acetylene is an amorphous carbon layer. This coating once again has outstanding barrier properties.

A further preferred version is characterized according to the invention in that the precursor gas is introduced into the vessel after the final forming and through the ignition a second combustion is triggered on the inner surface of the vessel for the formation of the coating.

The pre-forming at low pressure i.e. in the range between 2 and 15 bar and preferably at roughly 10 bar can be carried out with air or also—according to WO 98/06 559—with a combustible gas. The final forming at the higher blowing pressure takes place, as in the known blow moulding processes, in a pressure range between 20 bar and 600 bar, preferably at roughly 40 bar. When proceeding according to WO 98/06 559 in practice oxyhydrogen gas has already been used as combustible gas which was ignited for example externally with an ignition plug or with laser light.

Only after this final forming is the forerunner gas then introduced into the vessel in this last mentioned version in order to achieve a rapid combustion after ignition. The combustion of the precursor gas leads to the formation of the coating, which is deposited on the inner surface of the vessel in the desired way.

When the coating reaction takes place under unfavourable boundary conditions and at high pressure, the reaction is not always easy to control, and dust formation, flocculation or sand formation can occur. The reactants then do not form the desired dense coating, but form the waste sand, or dust or soot. The reactants can be influenced, just like the process parameters, and selected correctly in order to avoid this dust formation.

Thus silanes for example have been used which themselves ignite with oxygen and explode. This reaction can be so rapid that the disadvantageous sand formation is recorded to the detriment of a compact coating. According to the invention it was found however that the reaction can be slowed down by diluting the silane with an inert gas. Nitrogen, argon, helium or a mixture of the same can be used for this. By doing this the gas phase reaction leading to the dust formation is suppressed.

The reaction can be slowed down by the substitution of the hydrogen atoms of the silane molecules by less reactive structural elements, such as for example alkyl groups or alkoxy groups. Siloxanes can also be used instead of silanes. In order to avoid the mentioned sand formation, precursor combinations and gases can be chosen such that during combustion only an inorganic barrier layer is always produced.

The same applies when using hydrocarbons. The hydrocarbon compounds should be selected such that the reaction does not take place too quickly, otherwise dust or soot is formed. This is achieved by the use of saturated hydrocarbons. On the other hand dense—or even diamond-like—carbon layers are preferably formed if the hydrogen proportion in the compounds is small, if thus unsaturated hydrocarbons are used. The reaction becomes slower through the use of saturated hydrocarbons.

This means that, through the choice of the ratio of saturated to unsaturated hydrocarbons, the balance between the two effects is set such that at the end a good blocking effect of the resulting barrier layer is achieved.

Through the choice of the oxygen proportion in the gas mixture, the character of the resulting carbon coating can additionally be influenced, whether it namely has more the character of the diamond-like carbon coating or of the amorphous carbon coating.

In these versions the barrier layer is deposited on the inside of the vessel in a last combustion step after the vessel has been brought into its final shape, for example by an explosion process.

In a practical example a preform was pre-formed from PET with air at a pressure of 8 bar and then, by explosion of an oxyhydrogen gas mixture, brought into its definitive form of a bottle. After the expansion (after this explosion) a mixture of TMS and air was introduced into the vessel and conducted to a second and last combustion step, so that a barrier layer for oxygen resulted.

The above-described versions of the blow moulding and coating process according to the invention in which the coating took place at high pressure, bring with them, under certain process conditions, the danger of sand formation. This can be completely ruled out if another preferred version is provided which is characterized according to the invention in that a precursor material on the basis of a silicon, magnesium, aluminium, titanium, zinc, zirconium, boron, cerium, calcium or tin compound or the like or on the basis of mixtures thereof is applied as a prelayer to the inner surface of a moulded article in the form of a gas, vapour, mist or ductile solid, then an oxygen-containing, flammable gas mixture is introduced into the moulded article and ignited and, through this combustion, the coating on the basis of silicon oxide, silicon oxynitride, magnesium oxide, aluminium oxide, titanium oxide, titanium nitride, zinc oxide, zirconium oxide, boron oxide, cerium oxide, calcium oxide or tin oxide or the like or on the basis of mixtures thereof is formed on the inner surface of the moulded body. According to this third version a prelayer is applied to the inner surface of the moulded article. This is then reacted in the following process step to produce the desired barrier layer. This prelayer can be a soft prematerial, need only adhere to the inner wall of the moulded article and during the reaction and transformation to form the barrier layer, completely cover the inner wall. A dust or sand formation as in the above-described high-pressure process need not be feared here. The prelayer can be applied to the inner surface of the preform, of the intermediate moulded article or also of the finished vessel, of the final moulded article.

The precursor material applied to the preform or intermediate moulded article should preferably have a boiling point which is above the inner-wall temperature of the moulded article. A boiling point of $>20°$ C. is sufficient during application to the final moulded article, because the final moulded article is cooled.

A similar procedure is possible with liquid hydrocarbons. In the case of these volatile, liquid hydrocarbons paraffin-like layers can be produced for example.

The prelayer can be applied to the inner surface of the moulded article by spraying, condensation or polymerization. Alternatively it can be applied by means of a combustion, the combustion to be carried out such that dust formation is avoided. An deficit of oxidizing gases is used here for this purpose. The effect of this is that the deposited layer does not have the property of a barrier layer, but rather these barrier properties are provided by the subsequent reaction of the deposited layer.

For the transformation of the prelayer into the barrier layer the prelayer is subjected to an oxidation process in which oxygen or ozone are involved. The activation energy for this is supplied by a combustion process or by UV radiation. Thus for example hydrogen or ammonia can be used as oxygen-containing, flammable gas mixture together with an excess of oxygen, which is introduced into the moulded article and is ignited. Through the rapid combustion, accompanied by the chemical transformation of the prelayer, the desired barrier layer is formed.

For the production of an inorganic barrier layer, the oxyhydrogen gas mixture is preferably of a composition such that the oxygen proportion is present in excess in relation to the combustion of the prelayer, i.e. the oxygen proportion is higher than is necessary for the total combustion of the prelayer in for example silicon oxide which forms the barrier layer. In this case the oxidizing operating mode is referred to. This is expedient when the oxygen is needed not only for the explosion or combustion, but also for the reacting out of the precursor material to form the barrier layer. This second or last combustion or explosion of this gas mixture allows the prelayer to react further to form a solid, dense barrier layer which in the case of a precursor material based on silicon is a coating based on silicon oxide.

For the production of a diamond-like or amorphous carbon barrier layer the process must naturally not be carried out with an oxygen excess.

For such a carbon barrier layer it is advantageous according to the invention if a precursor material, that consists of at least one volatile hydrocarbon compound on the basis of alkanes, alkenes, alkines or aromatics, alkanols, ethers, aldehydes, ketones, epoxides, organic acids, esters or corresponding anhydrides, is applied in the form of a gas, vapour or mist as prelayer to the inner surface of a moulded article, an oxygen-containing, flammable gas mixture is then introduced into the moulded article and ignited and, through this combustion, a carbon-based coating is formed on the inner surface of the vessel.

The formation of the barrier layer is also satisfactory if for example dinitrogen oxide ($N_2O$) is used as the oxygen-containing, oxidizing gas.

The barrier layer can contain both nitrogen and carbon.

It is advantageous according to the invention if, in a further version, the oxygen-containing gas mixture, flammable for the second combustion contains ozone. This gas is introduced again after the deposition of the prelayer on the inner surface of the vessel and is strongly oxidizing. The introduction as gas has the advantage that all parts of the inner surface of the vessel come into contact with this gas. Ozone has in addition the advantage that it is commercially cheap and can be produced in large amounts by available generators. Through the use of ozone the prelayer and any remaining precursor material which has not yet reacted is directly oxidized, the barrier layer thus being formed in the process. According to this version no precursor material remains in the vessel. This is favourable in particular in cases where a migration of the precursor material into the packaged product which is finally to be packed in the finished vessel, is to be avoided.

The use of ozone which is known to be an effective and food-compatible sterilizing agent, has in addition the desired side effect of raising the level of sterility inside the vessel.

The above blow moulding process with the prelayer is furthermore advantageously designed in that yet another version for the production of the barrier layer, there is a partial combustion of the precursor material, preferably of a volatile silicon compound, through an oxidizing compound in deficit in reductive operating mode/reaction and thereafter a further oxygen-containing gas is introduced into the vessel and is mixed with at least one flammable gas, the mixture is ignited to produce a definitive third combustion, the gas mixture having an excess of oxidizing gases for the combustion of the prelayer and the creation of the barrier coating taking place in oxidizing operating mode/reaction. In this version the formation of the prelayer can take place by the mentioned partial combustion of a precursor material, for example of a volatile, preferably also flammable silicon compound, through an oxidizing compound, such as for example oxygen or dinitrogen oxide. This combustion is to take place under a specific condition, namely that the ratio of the oxidizing compound to the forerunner material is not sufficient for a total oxidation of the forerunner material. This is an oxygen-poor or reductive operating mode/reaction. After this partial combustion in this version the precoating is then transformed in a subsequent step by another combustion or explosion of a gas mixture into a barrier layer such as is described in the following, in oxidizing operating mode. This combustion of the gas mixture again takes place as was already described above. A mixture of at least one oxidizing gas (for example oxygen or dinitrogen oxide ($N_2O$)) and at least one flammable gas (for example hydrogen or ammonia), preferably an oxyhydrogen gas mixture, is ignited. The oxyhydrogen gas mixture is structured such that the proportion of oxygen reacts in excess, i.e. is higher than is necessary for the total combustion of the prelayer to form the barrier layer (barrier layer=for example silicon oxide). This is the oxidizing operating mode. The oxygen excess is necessary for the reacting out of the prelayer to form the barrier layer.

In a further version the partial combustion of the precursor material is combined according to the invention with the definitive third combustion to form the barrier layer, and this combustion begins in reductive operating mode/reaction and ends in oxidizing operating mode/reaction. The two combustion steps of the above-described version are not separated from each other in this last-mentioned version. It is only the proportion of the oxidizing compounds which is varied such that the process begins in reductive mode and ends in oxidizing mode. It was found that these reactions take place faster and the quality of the barrier layer is surprisingly even better.

A further other version of the blow moulding process according to the invention with the prelayer is characterized in that directly after the final shaping of the vessel, thus after the ignition of the oxyhydrogen gas or similar in the vessel, gaseous or liquid forerunner materials with functional groups are poured into the inside of the vessel, which are in a position to react with the radical spots left behind from the combustion process. Functional groups in this sense are for example vinyl groups. The formation of the radical spots is promoted by the deficit of oxygen (reductive operating mode) and/or by the addition of nitrogen to the combustible gas mixture.

A version of the process is also preferred in which nitrogen is added to the flammable gas mixture in order to form a satisfactorily adhering coating on the inner surface of the preform.

These radical spots are particularly favourably formed by the addition of nitrogen to the combustible gas mixture. The precursor material which is added directly after combustion (explosion), reacts directly with these radical spots. A grafted-on and thin layer which adheres very well is thereby formed on the inner surface of the moulded article.

It is furthermore expedient if, according to the invention, the oxygen-containing gas mixture reacts, while exposed to the action of UV radiation of a lamp, preferably an excimer lamp, with the prelayer to form the barrier layer. There are such UV lamps with a radiation with a high proportion of short wave lengths. An excimer lamp is particularly favourable. This can be introduced into the vessel after the application of the prelayer.

It is particularly favourable if an explosion or combustion is used for the production of the UV radiation. The UV radiation gives the necessary energy for the transformation of the deposited forerunner material into the desired barrier layer. If the combustion is used to produce the UV radiation, then a bulky UV lamp or the like does not need to be introduced into the vessel, which is a further advantage. It has also proved favourable to avoid the UV radiation production from outside, because as a result the vessel material is not so easily damaged.

It can be favourable in this connection if according to the invention nitrogen or xenon is added to the oxygen-containing, flammable gas mixture, which is then ignited for the second combustion and emits UV radiation. In this way, the UV radiation can be created by the combustion (explosion) itself. This can happen for example via the formation of excited compounds ("excimers"). These excimers then disintegrate under the emission of UV radiation.

The excimer radiation can have noticeably high quantum energies. Therefore the use of xenon according to the above version is favourable. Xenon has the advantage that it can form excimers in homogeneous phase without needing to introduce a second gas component. The excited xenon ($Xe_2^*$) excimer has a radiation disintegration with an emission wave length of 172 nm (quantum energy: 7.2 eV). The surface can also be sterilized by xenon. As xenon is a noble gas and thus is not bound to the ready-worked barrier layer, xenon which had been added to the combustion materials can with further advantage then be treated again by standard methods after the coating process.

It can also be provided according to the invention to apply a precursor material on the basis of a silicon, magnesium, aluminium, titanium, zirconium, zinc, boron, cerium, calcium or tin compound or the like in the form of a liquid or of a ductile solid as prelayer to the inner surface of the preform before the pre-forming of the vessel at low pressure, an oxygen-containing, flammable gas mixture being introduced into the preform after the pre-forming and ignited, whereby the preform is shaped into its definitive form by the higher blowing pressure arising during the combustion and the coating on the basis of silicon oxide, silicon oxynitride, magnesium oxide, aluminium oxide, titanium oxide, titanium nitride, zinc oxide, zirconium oxide, boron oxide, cerium oxide, calcium oxide or tin oxide or the like or on the basis of mixtures thereof being simultaneously formed on the inner surface of the vessel. The application of the prelayer to the inner surface of the preform can take place both inside (as described above) and outside the blow moulding machine. A coinjection process for example is used for application outside the blow moulding machine.

Silicon compounds or other suitable compounds (forerunner materials) with a low vapour pressure are introduced into the preform or intermediate moulded article before the final forming, this preferably taking place in a temperature range of the inner wall between 80° C. and 120° C.; or they are introduced into the finally shaped vessel (final moulded article) after the final forming, this preferably taking place in a temperature range of the inner wall between 20° C. and 40° C. The prelayer therefore forms on the inner surfaces of the vessel.

All of the processes according to the invention with the prelayer have in addition the following further advantages: Because the prelayer to the barrier layer is transformed starting from the surface into the depth of the wall, in most cases the prelayer has a density and rigidity gradient directed perpendicular to the vessel wall. The barrier layer is comparatively soft and open to diffusion near the boundary surface with the plastic material from which the vessel is made. On the other hand, near its surface which is directed towards the inside of the vessel, the barrier layer is rigid and tight. This is very favourable as regards the resistance of the barrier coating to bursting, which could otherwise be caused by bending, stretching, impacts or temperature changes.

To further advantage, the oxidation and thus the compaction of the given prelayer is the last step in the series of explosion and/or combustion processes. It can thereby be achieved that the oxidized, rigid layer is not overstressed, because virtually all of the blowing into the final form is completed by previous explosion and/or combustion processes. The advantage is a noticeably reduced tendency to tear on the part of the barrier layer.

Already-known processes have been described at the start as to how a vessel can be shaped out. In addition to explosion-stretch blow moulding the classic stretch blow moulding with the two pressure stages has also been described, namely the pre-forming at low pressure and the final forming at a higher blowing pressure between 20 bar and 600 bar. According to the invention after this final forming, the classic stretch blow moulding, a forerunner gas can be introduced into the vessel and ignited to form the coating.

In this classic process for blow moulding a vessel from a preform made of plastic, which is pre-formed after heating by a gas blown into the vessel at a low pressure of between 2 bar and 15 bar with an accompanying increase in its internal volume and is then shaped out into its definitive form by blowing in a further gas at higher blowing pressure of between 20 bar and 600 bar into the vessel, to achieve the object of providing a coating on the inner surface of the vessel, it is taught according to the invention that a combustible precursor gas is blown into the expanded, shaped out vessel and ignited and, through the combustion, a coating is formed on the inner surface of the vessel. Preferably in the classic process the further gas is blown into the vessel at a blowing pressure of roughly 40 bar so that this obtains its definitive form. According to the invention this blown-in gas is let out to roughly normal pressure by the expansion process, after which the combustible precursor gas is blown in. As with the advantages mentioned at the start the coating results from the combustion of the precursor gas, for example a coating based on silicon oxide or on organic carbon. The combustion step again allows not only a cheap coating without great outlay on machinery, but also produces an aseptic packaging if desired, the vessel being aseptic directly after its production.

It is advantageous if upon further development the precursor gas is formed on the basis of silicon, magnesium, aluminium, titanium, zinc, zirconium, boron, cerium, calcium or tin oxide or the like or on the basis of mixtures thereof and if a coating on the basis of silicon oxide, silicon oxynitride, magnesium oxide, aluminium oxide, titanium oxide, titanium nitride, zinc oxide, zirconium oxide, boron oxide, cerium oxide, calcium oxide or tin oxide or the like or on the basis of mixtures thereof results. It is also favourable if the precursor gas consists of at least one volatile hydrocarbon compound based on alkanes or alkenes, alkines, aromatics, alkanols, ethers, aldehydes, ketones, epoxides, organic acids, esters or corresponding anhydrides.

The features and advantages which are achieved with the new coating process in combination with the explosion-stretch blow moulding described at the start also result for the classic blow moulding process. For example the precursor gas can consist of a mixture of at least one volatile metal compound and at least one volatile hydrocarbon compound. The precursor material can also be applied as prelayer to the inner surface of a moulded article in the form of a gas, vapour or mist, after which an oxygen-containing, flammable gas mixture is introduced into the moulded article and is ignited and the desired coating results. A separate repetition of all the features and advantages does not seem necessary here. Rather, reference is made to the above versions which also apply in connection with the classic stretch blow moulding.

Figure 2:
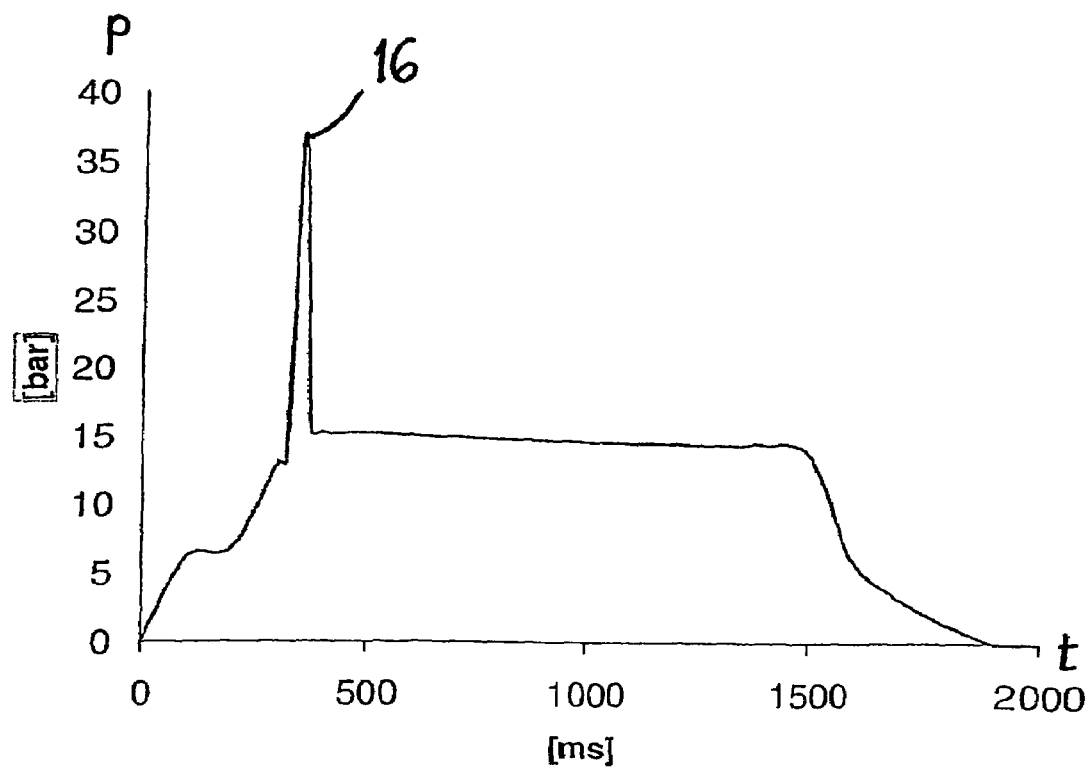
Figure 3:
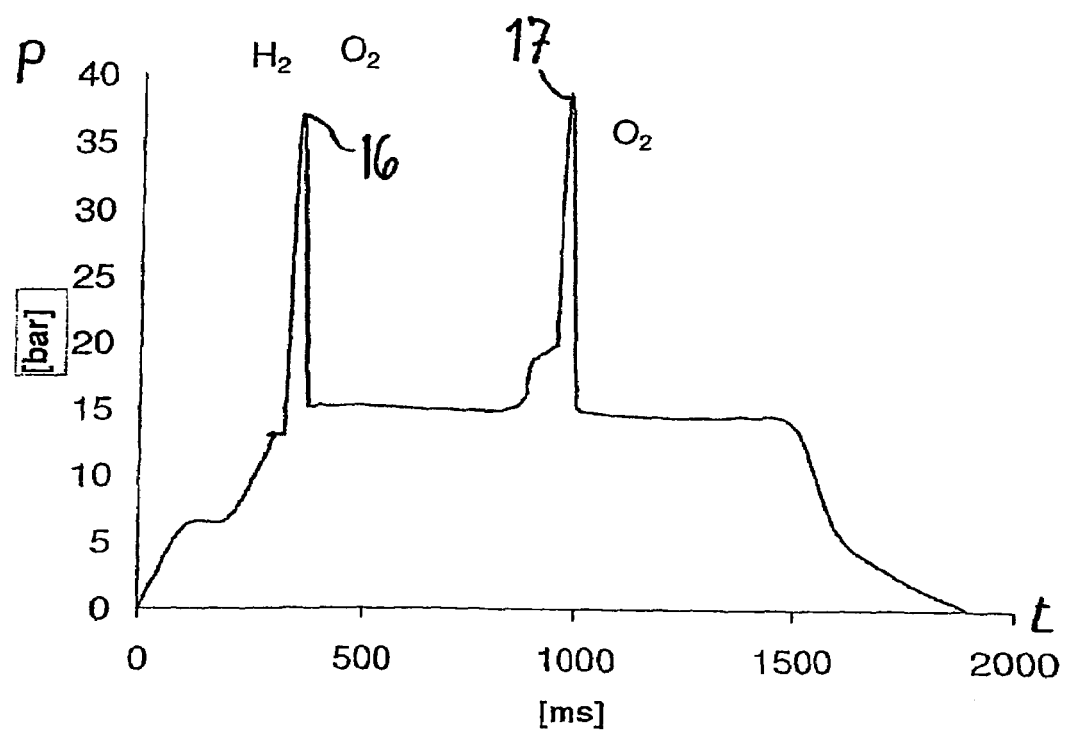
Figure 4:
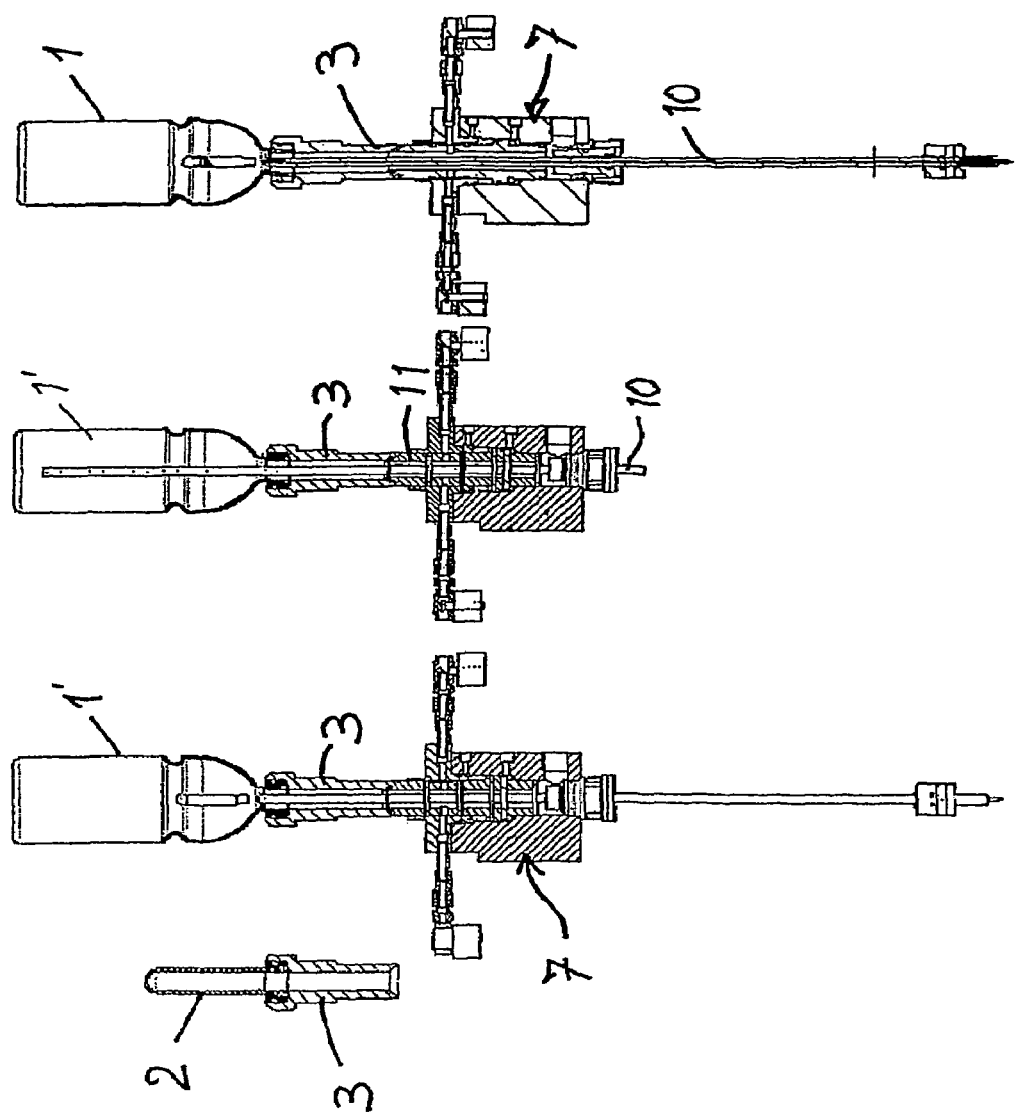
Figure 5:
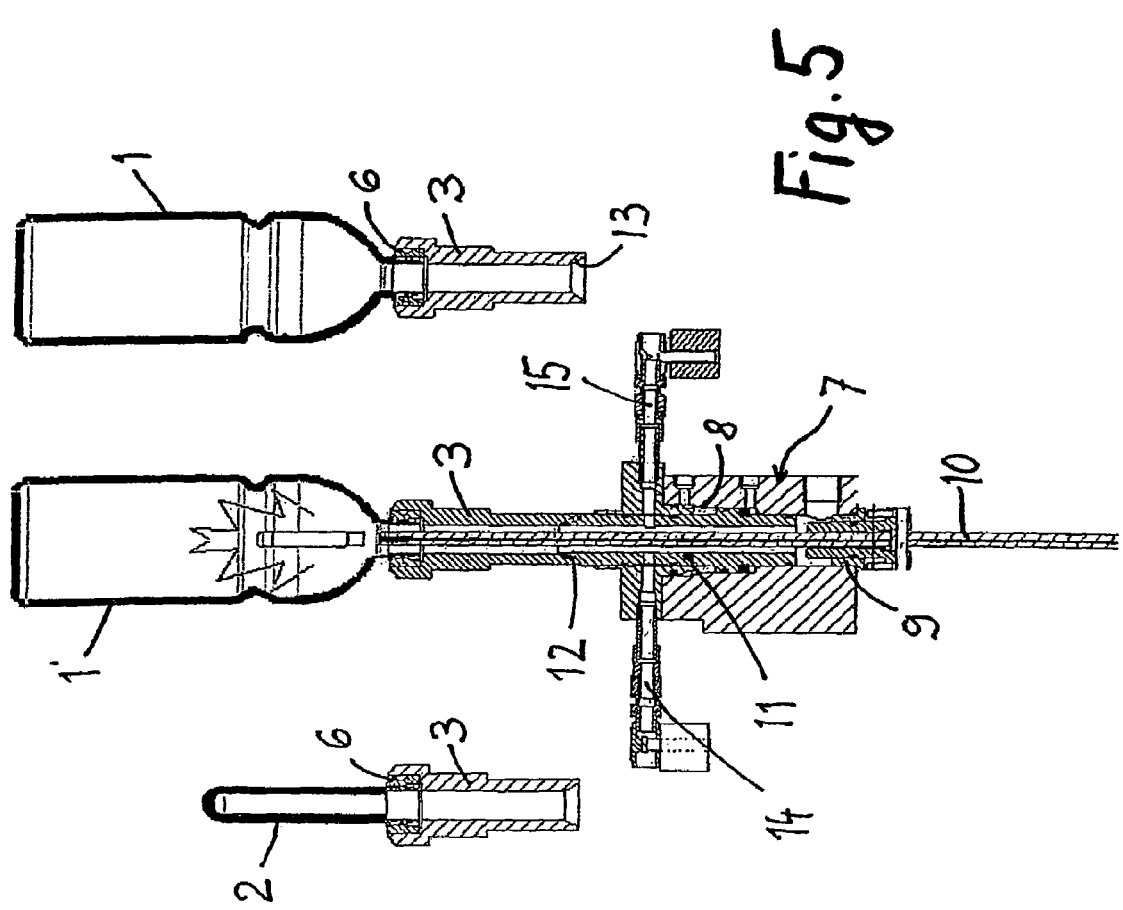

Further advantages, features and application possibilities of the present invention result from the following description of preferred versions in connection with the accompanying drawings. Of these:

FIG. 1 shows schematically three different operating states of the blow moulding process with the preform on the left, the moulded article that has just been blown up in the centre and the ready-removed vessel on the right, the preform or the vessel sitting in a housing, FIG. 2 a diagram of the pressure pattern over time in a first version, FIG. 3 the same pressure pattern in a second version, FIG. 4 a similar view to FIG. 1, but in another further version and FIG. 5 a similar view to FIG. 1, the intention however being to show how the preform held to the left of the housing is provided with the prelayer and the other process is thereafter carried out.

While the finally shaped vessel 1 is represented as a PET bottle with the normal dimensions, the preform is in each case shown in the left-hand position and is numbered 2. This preform 2 is likewise held by a housing 3 like the intermediate moulded article 1' and the finished vessel 1. Of the entire production unit, only the parts important for the invention are shown, while parts of the mould known per se and unimportant for the invention are left out, thus for example the blowing mould, the mould cavity which corresponds to the finished vessel 1 and other normal machine parts. The housings and tracks for the transport of the work pieces which are successively processed from left to right in FIGS. 1, 4 and 5 are therefore also missing from the representations.

At the upper end of the housing 3 a service area 4 is formed in which a centring device 6 is inserted. The vessel 1 to be produced in the form of a PET bottle is supported with its open end head-over facing downwards in the centring device 6 and held in sealing manner in the housing 3.

A manifold block numbered 7 is located stationary against the machine and has a continuous vertical bore 8. Seated in this below is a sealing passage 9, through which a plug 10 is guided concentrically and in sealing manner and can be moved oscillating up and down in the manifold block 7. Located a short distance above the sealing passage 9 in the inside of the manifold block 7 is a hollow piston 11 which is driven movable relative to the stationary manifold block 7 axially in the mentioned bore 8 and thus parallel to the central longitudinal axis. The plug 10 runs essentially in this longitudinal central axis. The movable plug 10 is arranged axially flush with the housing 3 entering the latter and also the preform 2, intermediate moulded article 1' or vessel 1 held by this.

The hollow piston 11 has, at its upper, that is outer, end facing the housing 3, an annular counter-sealing surface 12 fitting the latter. The hollow housing 3 has, at its end facing away from the vessel 1 or the preform 2 (below), an annular sealing surface 13. This fits the counter-sealing surface 12 of the hollow piston 11 in such a way that, when the hollow piston 11 moves downwards the housing 3 becomes free from the whole of the lower connecting structure and can be moved horizontally sideways. Gases, such as for example oxygen and hydrogen, can be guided laterally through lines 14 and 15 through the hollow piston 11 and the housing 3 upwards into the inside of the preform 2, intermediate moulded article 1' or the vessel 1.

The process with the ignition of the explosive mixture can be well explained with reference to FIGS. 2 and 3, which each represent a pressure graph. In both, the pressure p (in bars) in the inside of the moulded article 1, 1', 2 is plotted over the time t (in milliseconds).

The respective finished vessel 1 with the housing 3, i.e. the right-hand station in FIG. 1, is to be thought of as having moved horizontally to the right. Firstly the housing 3 with the preform 2 is moved from the left-hand position into the centre and fitted onto the hollow piston 11 and connected in sealing manner to the manifold block 7 via the seals 12 and 13.

Then at time t=0 in the process according to FIG. 2 a combustible gas is raised with a precursor gas, for example TMS (tetramethylsilane), to a pressure of roughly 12 bar to increase the internal volume of the preform 2 and ignited after roughly 300 ms. A brief pressure increase to roughly 37 bar occurs. At this pressure peak 16 the final shaping is achieved and a coating which consists of silicon oxide is formed on the inner surface of the vessel by reaction of the precursor gas TMS with oxygen. In order to cool down the freshly blow moulded vessel 1 a pressure of roughly 15 bar is maintained until time t=1500 ms. Venting is then carried out and the vessel 1 reaches the right-hand position in FIG. 1, in which the inside of the vessel can be vented to atmospheric pressure.

In another process according to the pressure graph of FIG. 3 the pre-forming takes place accompanied by an increase in the pressure of an oxyhydrogen gas until ignition of the same as in the version of FIG. 2. The final forming is again achieved at the pressure peak 16. In contrast to FIG. 2 the final forming took place here however only through a combustible gas, for example oxyhydrogen gas. At time t=1000 ms a combustible gas, for example hydrogen and oxygen were exploded together with a precursor gas, for example TMS, by ignition. A second pressure peak 17 forms through this explosion, in which the medium capable of being coated oxidizes and is reacted out to form the desired final coating of the inner wall of the vessel. Thereafter there is again a cooling period until t=1500 ms. The inside of the vessel is then expanded and optionally vented.

FIG. 4 shows four different top positions. In the furthest left position the preform 2 is still located on the housing 3. The preform is moved to the right into the second position above the manifold block 7 and is connected there in a sealing manner. Oxyhydrogen gas is introduced and ignited here for the final forming of the still uncoated final moulded article 1'. After this step the prelayer is applied according to the third position in FIG. 4 from the left. After the final forming a precursor material based on silicon is sprayed in liquid form at an atmosphere normal pressure onto the inner wall of the finally shaped intermediate moulded article 1', or deposited by condensation. This third position in FIG. 4 shows the soft prematerial, the soft prelayer, already applied to the inner wall of the intermediate moulded article 1'.

An oxygen-containing, flammable gas mixture, for example oxyhydrogen gas, is then introduced according to the fourth furthest right position in FIG. 4 and ignited to produce a final combustion. This combustion effects the reacting out of the prelayer into the desired coating based—in this special case—on silicon oxide.

FIG. 5 shows a similar structure to FIG. 1. The difference here is however that by condensation or polymerization a prelayer has been applied to the inner surface of the preform 2. Only then does the pre-forming at low pressure take place, and then finally the definitive combustion for the final forming and for the reacting out of the prelayer to produce the desired coating based—in this special case—on silicon oxide.

LIST OF REFERENCE NUMBERS 1 vessel
1' intermediate moulded article
2 preform
3 housing
4 service area
6 centring device
7 manifold block
8 vertical bore
9 sealing passage
10 plug
11 hollow piston
12 counter-sealing surface
13 annular sealing surface
14 gas line
15 gas line
16 pressure peak
17 pressure peak

The invention claimed is:

1. A process for blow moulding a vessel (1) comprising pre-forming a heated preform (2) by a blowing gas which is blown into the preform (2) at a pressure of between 2 bar and 15 bar to increase internal volume of the preform to form a pre-formed preform as an intermediate molded article; and, shaping the pre-formed preform into a final definitive form by ignition of a blown-in, combustible gas mixture as a result of higher pressure arising during resulting combustion, wherein a precursor gas is added to the combustible gas to form a mixture which, through combustion forms a coating on an inner surface of the vessel (1).

2. A process according to claim 1, wherein the precursor gas comprises an element selected from the group consisting of silicon, magnesium, aluminum, titanium, zinc, zirconium, boron, cerium, calcium, tin and mixtures thereof and a coating comprising an oxide selected from the group consisting of silicon oxide, silicon oxynitride, magnesium oxide, aluminum oxide, titanium oxide, titanium nitride, zinc oxide, zirconium oxide, boron oxide, cerium oxide, calcium oxide, tin oxide and mixtures thereof results.

3. A process according to claim 2, wherein the blowing gas and combustible gas are the same and the precursor gas is added before pre-forming the preform and the coating is formed during shaping into the final definitive form.

4. A process according to claim 1, wherein the precursor gas comprises a volatile hydrocarbon compound selected from the group consisting of alkanes, alkenes, alkynes, aromatics, alkanols, ethers, aldehydes, ketones, epoxides, organic acids, esters, anhydrides and mixtures thereof.

5. A process according to claim 4, wherein the blowing gas and combustible gas are the same and the precursor gas is added before pre-forming the preform and the coating is formed during shaping into the final definitive form.

6. A process according to claim 1, wherein the precursor gas comprises a mixture of at least one volatile metal compound and at least one volatile hydrocarbon compound.

7. A process according to claim 6, wherein the blowing gas and combustible gas are the same and the precursor gas is added before pre-forming the preform and the coating is formed during shaping into the final definitive form.

8. A process according to claim 1, wherein the blowing gas and combustible gas are the same and the precursor gas is added before pre-forming the preform and the coating is formed during shaping into the final definitive form.

9. A process for blow moulding a vessel (1) comprising pre-forming a heated plastic preform (2) by a gas which is blown into the preform (2) at low pressure of between 2 bar and 15 bar with an accompanying increase in its internal volume and shaping the preform into its definitive final vessel form (1) by ignition of a blown-in, combustible gas by a higher blowing pressure arising during combustion, wherein a precursor material comprising an element selected from the group consisting of silicon, magnesium, aluminum, titanium, zinc, zirconium, boron, cerium, calcium, tin and mixtures thereof is applied to an inner surface of a vessel (1) as prelayer in the form of a gas, vapour or mist, and introducing an oxygen-containing, flammable gas mixture into the vessel and igniting the flammable gas mixture to form a coating comprising a compound selected from the group consisting of silicon oxide, silicon oxynitride, magnesium oxide, aluminum oxide, titanium oxide, titanium nitride, zinc oxide, zirconium oxide, boron oxide, cerium oxide, calcium oxide, tin oxide and mixtures thereof on an inner surface of the vessel.

10. A process according to claim 9, wherein the oxygen-containing gas mixture flammable for the second combustion contains ozone.

11. A process according to claim 9, wherein there is a partial combustion of the precursor material, through an oxidizing compound in deficit to incompletely oxidize the precursor to form the prelayer and that thereafter a further oxygen-containing gas is introduced into the vessel (1) and mixed with at least one flammable gas, and the further mixture is ignited to produce a definitive third combustion, the further oxygen-containing gas mixture having an excess for the combustion of the prelayer and the creation of an internal coating takes place in an oxidizing reaction.

12. A process according to claim 11, wherein the partial combustion of the precursor material to form the prelayer is combined with the definitive third combustion to form the coating, the third combustion beginning in a reduction reaction and ending in an oxidation reaction.

13. A process according to claim 9, wherein the partial combustion of the precursor material to form the prelayer is combined with the definitive third combustion to form the coating, the third combustion beginning in a reduction reaction and ending in an oxidation reaction.

14. A process according to claim 9, wherein directly after the final shaping of the vessel (1), gaseous or liquid precursor materials with functional groups are introduced into the inside of the vessel, which are in a position to react with reactive sites left behind by the combustion process.

15. A process according to claim 9, wherein the oxygen-containing gas mixture reacts, while exposed to the action of UV radiation of a lamp, with the prelayer to form the coating.

16. A process according to claim 9, wherein nitrogen or xenon is added to the oxygen-containing, flammable gas mixture which is then ignited for the second combustion and emits UV radiation.

17. A process for blow moulding a vessel (1) comprising pre-forming a heated plastic preform (2) by a gas which is blown into the preform at a low pressure of between 2 bar and 15 bar with an accompanying increase in its internal volume and shaping the preform into its final vessel definitive form by ignition of a blown-in, combustible gas by a higher blowing pressure arising during combustion, wherein a precursor material comprising at least one volatile hydrocarbon compound selected from the group consisting of alkanes, alkenes, alkynes, aromatics, alkanols, ethers, aldehydes, ketones, epoxides, organic acids, esters, anhydrides, and mixtures thereof is applied in the form of a gas, vapour or mist as prelayer to an inner surface of the vessel, and introducing an oxygen-containing, flammable gas mixture into the vessel and igniting the flammable gas mixture to form a carbon-based coating on an inner surface of the vessel.

18. A process according to claim 17, wherein directly after the final shaping of the vessel (1), gaseous or liquid precursor materials with functional groups are introduced into the inside of the vessel, which are in a position to react with reactive sites left behind by the combustion process.

19. A process according to claim 17, wherein nitrogen is added to the flammable gas mixture to form a satisfactorily adhering coating in the inner surface of the preform.

20. A process according to claim 17, wherein the oxygen-containing gas mixture reacts, while exposed to the action of UV radiation of a lamp, with the prelayer to form the coating.

21. A process according to claim 17, wherein nitrogen or xenon is added to the oxygen-containing, flammable gas mixture which is then ignited for the second combustion and emits UV radiation.

22. A process for blow moulding a vessel (1) from a heated plastic preform (2) which preform is itself pre-formed by a gas which is blown into the preform at low pressure of between 2 bar and 15 bar with an accompanying increase in its internal volume and the pre-formed preform is then shaped into its definitive form by ignition of a blown-in, combustible gas by the higher blowing pressure arising during the combustion, wherein a precursor material comprising silicon, magnesium, aluminum, titanium, zinc, zirconium, boron, cerium, calcium, tin or mixtures thereof is applied in the form of a gas, vapour, mist or a ductile solid as prelayer to the inner surface of the preform (2) before the pre-forming of the vessel (1) at low pressure, oxygen-containing, flammable gas mixture is then introduced into the preform (2) and ignited, whereby the preform (2) is shaped into a final vessel definitive form by the higher blowing pressure arising during the combustion and simultaneously a coating comprised of silicon oxide, silicon oxynitride, magnesium oxide, aluminum oxide, titanium oxide, titanium nitride, zinc oxide, zirconium oxide, boron oxide, cerium oxide, calcium oxide, tin oxide or mixtures thereof is formed on an inner surface of the vessel.

23. A process for blow moulding a vessel (1) from a plastic preform (2), which preform is itself pre-formed after heating by a gas blown into the preform at low pressure of between 2 bar and 15 bar with an accompanying increase in internal volume of the preform and the preform is then shaped into its final vessel definitive form by blowing in a further gas at higher blowing pressure of between 20 bar and 600 bar, wherein a combustible precursor gas is blown into the vessel definitive form and ignited and through the combustion, a coating is formed on an inner surface of the vessel (1).

24. A process according to claim 23, wherein the precursor gas contains silicon, magnesium, aluminum, titanium, zinc, zirconium, boron, cerium, calcium or tin or mixtures thereof and wherein a coating on the basis of silicon oxide, silicon oxynitride, magnesium oxide, aluminum oxide, titanium oxide, titanium nitride, zinc oxide, zirconium oxide, boron oxide, cerium oxide, calcium oxide, tin oxide or mixtures thereof results.

25. A process according to claim 23, wherein the precursor gas consists of at least one volatile hydrocarbon compound selected from the group consisting of alkanes, alkenes, alkynes, aromatics, alkanols, ethers aldehydes, ketones, epoxides, organic acids, esters and anhydrides.

* * * * *